United States Patent Office 3,535,143
Patented Oct. 20, 1970

3,535,143
PREPARATION OF COATINGS FROM A CaCl₂-ALCOHOL SOLUTION CONTAIN- POLYETHERURETHANES
George Shkapenko, Akron, and Gerald E. Van Gils, Tallmadge, Ohio, assignors to The General Tire & Rubber Company, Akron, Ohio, a corporation of Ohio
No Drawing. Filed Jan. 16, 1968, Ser. No. 698,149
Int. Cl. B32b 27/40; B44d 1/44
U.S. Cl. 117—63                   8 Claims

ABSTRACT OF THE DISCLOSURE

This invention comprises a $CaCl_2$-alcohol solvent containing certain polyetherurethanes as a solute and the use of such a solution for the treatment of sponges and foams to render them hydrophilic and for the preparation of microporous films by applying the solution as a coating to the desired substrate surface, preferably drying the coated surface, and washing the coated surface with water, preferably followed by another drying step.

THE INVENTION

Polyurethanes have been employed in both foamed and unfoamed states and both rigid and flexible states. Among the many applications which have been tried is the use of polyurethane films, either fabric-supported or self-supporting, as a leather substitute in wearing apparel. However, the polyurethane films having the necessary flexibility for such apparel as shoes, boots, jackets, caps or gloves have had insufficient porosity to allow the transmission of water vapor through the films thereby interfering with the normal evaporation of perspiration from the body and creating great personal discomfort to the wearer of the apparel. This lack of porosity in the films also eliminates the "breathing" required of apparel for maximum wearer comfort.

Likewise, polyurethane foams have been employed in wearing apparel. Preparation of fine pore, open cell foams have made the problem of porosity less critical, but the properties of such foams could well be improved. For example, in wearing apparel the foams are relatively thin for purposes of flexibility, but in such applications such as mattress or seat padding, the foams are substantially thicker and the problem of porosity correspondingly more apparent. Furthermore, polyurethane foams appear to be essentially hydrophobic and do not absorb water as, for example, the commercially popular viscose cellulose sponges.

It is an object of this invention to provide a means for preparing flexible or rigid microporous polyetherurethane films which can be self-supporting or supported by flexible substrates.

Another object of this invention is to provide a method for making polyetherurethane films which can be satisfactorily substituted for leather.

Another object of this invention is to provide a composition suitable for the treatment of polyurethane foams to render them hydrophilic.

Another object of this invention is to provide a composition suitable for the preparation of microporous polyurethane films.

These objects as well as other objects which will become apparent from the following description are satisfied by this invention.

This invention comprises a liquid composition comprising a solution of $CaCl_2$ in an alcohol containing from one to three carbon atoms per molecule, in said solution the weight ratio of $CaCl_2$ to alcohol ranging from about 0.1:1 to about 0.4:1, said solution containing dissolved therein from about 2 to 30 percent by weight of at least one polyetherurethane based on the total weight of the solution, each of said polyetherurthanes having a molecular weight of from about 5,000 to 50,000.

The subject solution is prepared by dissolving $CaCl_2$ in the desired alcohol within the weight ratio range set forth. The alcohol can be methanol, ethanol, n-propanol or isopropanol, but commercial ethanol is preferred. Although $CaCl_2$ and alcohol can be in a weight ratio of from 0.1:1 to 0.4:1, the preferred weight ratio range is from about 0.15:1 to about 0.3:1, depending on the desired concentration of polyurethanes in the solution.

The polyetherurethanes which are operable in the solution of this invention are prepared from (a) polyethers which are essentially diols and in which each of the ether segments or units can contain from 2 to 6 alkylene carbon atoms and (b) aliphatic diisocyanates containing up to about 6 carbon atoms exclusive of the NCO groups. The polyurethanes, also, may be obtained by the reaction of aliphatic diamines (2–6 carbon atoms) with bischloro formates of glycols (2–6 carbon atoms) or polyether glycols (2–6 carbon atoms between oxygen atoms). The bischloro formates are obtained by the reaction of phosgene with the glycols or polyether glycols. They can have an average molecular weight of from about 5,000 to 50,000, but they preferably have an average molecular weight in the range of about 10,000 to 30,000. They can be prepared by any of the methods well-known in the art. They can be prepared either in a multi-step procedure or by a "one-shot" process. These polyurethanes may be considered to be aliphatic essentially linear polyetherurethanes. Mixtures of the polyetherurethanes can be used.

The polyurethanes are dissolved in the solution of calcium chloride and alcohol in amounts ranging from about 2 to 30 percent by weight based on the total weight of the solution depending on the use of the solution and to some degree the substrate. When the solution is to be applied to the surface of a substrate such as a sponge, the polymer concentration is generally low, e.g. in the order of 2 to 10 weight percent. When the solution is employed in the preparation of a microporous film, especially a self-supporting film, the polymer concentration is generally at least 10 weight percent. Preferably, the polymer concentration is no higher than 20 weight percent based on the total weight of the solution.

A sponge or foam is treated by soaking the sponge or foam in the solution, with or without squeezing, as limited by the type of foam and the degree of effect desired. The treated foam or sponge is then rinsed with clear water, preferably warm, and the resulting foam or sponge is both reticulate and hydrophilic. The foam or sponge treatment can be used effectively with both rigid and flexible foams including natural rubber foams, synthetic rubber (e.g., GRS) foams, polyurethane foams and polyvinyl chloride foams. The foam treatment is of particular use with flexible polyurethane foams and rubber latex sponges, improving the hydrophilic nature of these products to the point where they compare favorably with absorptive qualities of viscose cellulose sponges and also making the foam and sponge surfaces, as well as similarly treated synthetic fibers and fabrics, susceptible to dyes and other pigmenting fluids such as Fuchsine, Crystal Violet, Alizarin Blue and the like. To gain the maximum benefit from the treatment of a polyurethane foam, the foam preferably has fine uniform pores and has an open-cell structure to permit a maximum surface contact of the foam with the solution, thereby maximizing the hydrophilic effect derived from the foam treatment.

If desired, the treated foam or sponge can be dried, i.e. the alcohol can be removed, before the water wash. The effect of the solution treatment is heightened by the inclusion of the drying step, but the drying step is not necessary to get a significant effect. Similarly, the foam or sponge can be dried after the water wash as well.

When the polyetherurethane solution is used for the preparation of a microporous film, the solution preferably contains about 10 to 20 percent by weight polyurethanes. The solution is cast as a coating on a surface of a supporting substrate. The supporting substrate can be, for example, paper or natural or synthetic fabric, or any other substrate, and the film can be appied by hand or by a coating machine. The coating is dried by evaporation of the alcohol solvent, preferably by heating at a temperature below the boiling point of the alcohol. The coating is then washed with clear water, preferably warm water, and is dried. For the washing step, if the coating is a self-supporting film, the film coating can be removed from the supporting substrate before the washing step if desired. When the solution coating dries and the coating is leached with warm water, the films produced are microporous and have a flexibility heretofore unknown in the art.

The solution can, if desired, contain other polymers such as polyacrylonitriles and polyamides dissolved therein to reduce flexibility. The inclusion of some polyamide is especially desirable both when the solution is empoyed for the treatment of sponges and foams and when the solution is employed in the preparation of microporous films. When polymers other than polyurethanes are present in the solution, it is preferable that the polyurethane be at least 50 percent by weight of the total weight of the polymers present in solution and that the total polymer weight does not exceed 30 percent by weight of the solution as a whole.

Other additives may be included if desired.

The film products are especially useful in the manufacture of shoe uppers, upholstery and other leather applications. The foam and sponge products are useful as air and liquid filters, garment innerliners, mattresses and seat padding. Synthetic fabrics and yarns treated with the method described for sponge and foam treatment combine the advantages of synthetic fibers and fabrics with the comfort of natural fibers such as cotton in wearing apparel.

The film and foam products produced hereby can become a part of a laminated flexible article such as for example, one prepared by laminating the film between two layers of natural or synthetic fibers whereby the characteristics of the polyurethane, such as the noted flexibility and breathability, are relied upon without subjecting the film to direct wearing abuse as an outer surface. Similarly, either a non-foamed or a foamed polyurethane can be coated with a scuff coat or a slip coat.

The following examples are merely illustrative and are not intended to limit the subject invention which is properly delineated in the appended claims.

EXAMPLE I

Bis-chloroformate of polyether glycol was prepared as follows.

A 1,000 ml. four-necked flask equipped with dry ice reflux condenser with drying tube, air driven stirrer, gas inlet tube and dropping funnel was cooled to −20° C. Two hundred grams of phosgene gas was condensed in the flask via the gas inlet tube.

Two hundred grams of propylene oxide-ethlyene oxide copolymer (hydroxyl number 49.7 mg. KOH/gm.; average MW: 2260) containing about 15% ethylene ether groups, 55% of the hydroxyl groups being primarily hydroxyl groups, was added slowly to the phosgene under stirring over a period of 30 minutes. After addition was halted, the cooling bath was removed and the flask allowed to cool to ambient temperatures. Stirring under reflux was continued for five hours. At the end of this time, the flask was placed in a warm water bath and the phosgene distilled off under a slow stream of dry nitrogen.

The reaction mixture was at all times kept below 40° C.

Bis-chloroformate of 1,4-butanediol was prepared as described by N. J. Roljohn, JACS, 70 1181 (48).

A polyurethane was prepared as follows: a solution of 80.09 gm. of the bis-chloroformate of polyether glycol, 25 gm. of the bis-chloroformate of 1,4-butanediol and 0.7 gm. of nickel dibutyl dithiocarbamate in 1040 ml. of methylene chloride was added rapidly to a vigorously stirred solution of 1,6-hexane diamine and 42 gm. of $Na_2CO_3$ in 1375 ml. of water. After three minutes of stirring, the methylene chloride was distilled off on a steam bath and the resulting pale green rubbery polymer crumbs were separated and washed with water. The polymer was dried in a vacuum oven at 50° C. overnight.

The yield was 107 gm. (95% of theoretical). The polymer had an inherent viscosity of 2.3 dl./gm. (0.3 wt. percent in m-cresol).

Ten grams of the above polyurethane were dissolved in a solution of 22.5 grams of $CaCl_2$ in 67.5 grams of methanol. The resulting solution was cast as a coating on a fabric substrate. The coating was allowed to dry and was leached with warm water producing a tough, flexible film having good adhesion to the substrate.

The moisture vapor transmission (MVT) of the film was 5,000–6,000 gm./100 m.$^2$/hr.

EXAMPLE II

When solutions similar to the solution in Example I, but containing 15 and 20 percent respectively by weight of the polyurethane based on the total weight of the solution, are substituted for the solution in the film preparation described in Example I, similar excellent film coatings are obtained.

EXAMPLE III

When Example I is repeated including in the film-forming solution either 6 percent by weight of a polyamide or a polyacrylonitrile based on the total weight of solution, similar excellent film coatings are obtained varying primarily in flexibility and resilience.

EXAMPLE IV

One hundred fifty grams of $CaCl_2$ were dissolved in 850 grams of commercial ethanol, and the solution was clarified by filtration. Into this solution was dissolved 50 grams of the polyurethane prepared in Example I. This polyurethane-$CaCl_2$-alcohol solution was absorbed into a latex sponge and a flexible polyurethane foam, each having fine pores and an open structure, and allowed to dry after squeezing out the excess solution. The dried sponge and foam, either dried at room temperature or in an oven at elevated temperatures, were thoroughly washed in warm water, after which they had enhanced wettability and compared favorable with a viscose cellulose sponge.

When the experiment was repeated with the omission of the drying step before rinsing, the results were not appreciably different.

EXAMPLE V

When Example IV is repeated with a similar solution containing in addition 30 grams of a polyamide, similar excellent results are obtained.

We claim:

1. A method comprising (1) applying a liquid composition as a coating to a substrate surface, said liquid composition consisting essentially of a solution of $CaCl_2$ in an alcohol containing from one to three carbon atoms per molecule, in said solution the weight ratio of $CaCl_2$ to alcohol ranging from about 0.1:1 to about 0.4:1, said solution containing dissolved therein from about 2 to 30 percent by weight of at least one essentially linear aliphatic polyetherurethane based on the total weight of the solution, said polyurethane having an average molecular weight of from about 5,000 to 50,000 and having from 2 to 6 carbon atoms between ether linkages and from 2 to 6 carbon atoms between urethane linkages, and (2) washing the coated substrate surface with water, and (3) drying the coated substrate surface.

2. The method in accordance with claim 1 except that between steps (1) and (2) the coated surface of said substrate is dried.

3. A method in accordance with claim 1 wherein the substrate is a polyurethane foam.

4. A method in accordance with claim 1 wherein the solution contains dissolved therein at least one other organic polymer, the total weight percent of said additional polymers being no greater than the weight percent of polyetherurethanes and the total weight percent of all polymers in the solution being no greater than 30 percent by weight based on the total weight of the solution.

5. A method in accordance with claim 1 wherein the weight ratio of $CaCl_2$ to alcohol in said solution ranges from about 0.15:1 to about 0.3:1.

6. A method in accordance with claim 2 wherein the substrate is a solid smooth surface.

7. A method in accordance with claim 2 wherein the substrate is a fabric.

8. A method in accordance with claim 3 wherein the foam is a fine pore foam with an essentially open cell structure.

References Cited

UNITED STATES PATENTS

| | | | |
|---|---|---|---|
| 2,359,877 | 10/1944 | Schupp | 260—29 |
| 2,953,489 | 9/1960 | Young | 117—138.8 X |
| 2,955,056 | 10/1960 | Knox | 117—138.8 X |
| 3,000,757 | 9/1961 | Johnson et al. | 117—63 |
| 3,100,721 | 8/1963 | Holden | 117—161 X |
| 3,190,765 | 6/1965 | Yuan | 117—63 |
| 3,214,290 | 10/1965 | Larner et al. | 117—161 X |
| 3,264,134 | 8/1966 | Vill et al. | 117—63 |
| 3,369,925 | 2/1968 | Matsushita et al. | 117—63 |
| 3,449,153 | 6/1969 | Saligny et al. | 117—63 |
| 3,455,727 | 7/1969 | Dye | 117—138.8 X |

WILLIAM D. MARTIN, Primary Examiner

M. R. LUSIGNAN, Assistant Examiner

U.S. Cl. X.R.

117—135.5, 138.8, 161